(12) United States Patent
Kimura et al.

(10) Patent No.: US 11,293,553 B2
(45) Date of Patent: Apr. 5, 2022

(54) SEAL RING

(71) Applicant: EAGLE INDUSTRY CO., LTD., Tokyo (JP)

(72) Inventors: Wataru Kimura, Tokyo (JP); Yuichiro Tokunaga, Tokyo (JP); Yoshiaki Takigahira, Tokyo (JP); Toru Kono, Tokyo (JP); Hidetoshi Kasahara, Tokyo (JP); Jun Hiromatsu, Tokyo (JP); Takafumi Ota, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/046,261

(22) PCT Filed: May 16, 2019

(86) PCT No.: PCT/JP2019/019498
§ 371 (c)(1),
(2) Date: Oct. 8, 2020

(87) PCT Pub. No.: WO2019/221226
PCT Pub. Date: Nov. 21, 2019

(65) Prior Publication Data
US 2021/0080009 A1  Mar. 18, 2021

(30) Foreign Application Priority Data
May 17, 2018 (JP) .............................. JP2018-095696

(51) Int. Cl.
*F16J 15/34* (2006.01)
(52) U.S. Cl.
CPC ................................ *F16J 15/3412* (2013.01)

(58) Field of Classification Search
CPC .......... F16J 15/00; F16J 15/34; F16J 15/3412; F16J 15/3416; F16J 15/342;
(Continued)

(56) References Cited

U.S. PATENT DOCUMENTS

| 5,702,110 A | 12/1997 | Sedy ............................. 277/96.1 |
| 6,189,896 B1 | 2/2001 | Dickey et al. ................ 277/608 |

(Continued)

FOREIGN PATENT DOCUMENTS

| DE | 19713455 A1 * | 10/1998 | ............. F16J 15/441 |
| JP | 62-39308 | 8/1987 | ............... F16J 15/34 |

(Continued)

OTHER PUBLICATIONS

U.S. Appl. No. 17/047,369, filed Oct. 13, 2020, Kimura at al.
(Continued)

*Primary Examiner* — Nathan Cumar
(74) *Attorney, Agent, or Firm* — Hayes Soloway P.C.

(57) ABSTRACT

Provided is a seal ring configured so that a fluid film can be formed between sliding surfaces across a wide range of rotation speed and configured with high lubricity. A seal ring for sealing a clearance between a rotary shaft and a housing includes, dynamic pressure grooves formed at a sliding surface of the seal ring and having positive pressure generators and negative pressure generators, and static pressure supply paths formed at the sliding surface of the seal ring to extend from an inner diameter side to an outer diameter side and to open on a sealed fluid side. Each of the positive pressure generators, each of the negative pressure generators, and each of the static pressure supply paths are arranged in description order in a circumferential direction of the sliding surface.

20 Claims, 13 Drawing Sheets

(58) Field of Classification Search
CPC ...... F16J 15/3424; F16J 15/3428; F16J 15/16; F16J 15/50; F16J 15/52
USPC ........................................................ 277/399
See application file for complete search history.

(56) References Cited

U.S. PATENT DOCUMENTS

| | | | |
|---|---|---|---|
| 9,228,660 B2* | 1/2016 | Hosoe ................. | F16J 15/3412 |
| 2016/0003361 A1* | 1/2016 | Takahashi .............. | F16J 15/363 277/377 |
| 2016/0238134 A1* | 8/2016 | Ohya ..................... | F16J 15/441 |
| 2017/0009889 A1* | 1/2017 | Seki ....................... | F16J 15/164 |
| 2018/0045314 A1 | 2/2018 | Hosonuma et al. ... | F16J 15/164 |
| 2018/0292010 A1 | 10/2018 | Ohya et al. ............ | F16J 15/342 |

FOREIGN PATENT DOCUMENTS

| | | | | |
|---|---|---|---|---|
| JP | 3-41268 | 4/1991 | ............... | F16J 15/34 |
| JP | 3-88062 | 9/1991 | ............... | F16J 15/18 |
| JP | 4-272581 | 9/1992 | ............... | F16J 15/34 |
| JP | 5-61566 | 8/1993 | ............... | F16J 15/26 |
| JP | 8-28709 | 2/1996 | ............... | F16J 15/18 |
| JP | 9-210211 | 8/1997 | ............... | F16J 15/18 |
| JP | 10-281299 | 10/1998 | ............... | F16J 15/34 |
| JP | 2000-310336 | 11/2000 | ............... | F16J 15/16 |
| JP | 2008-275052 | 11/2008 | ............... | F16J 15/18 |
| JP | 2009-250378 | 10/2009 | ............... | F16J 15/34 |
| JP | 2012-2295 | 1/2012 | ............... | F16J 15/34 |
| WO | WO 2014/041832 | 3/2014 | ............... | F16J 15/18 |
| WO | WO 2014/142265 | 9/2014 | ............... | F16J 15/34 |
| WO | WO 2015/045974 | 4/2015 | ............... | F16J 15/46 |
| WO | WO 2015/111707 | 7/2015 | ............... | F16J 15/18 |
| WO | WO 2016/148043 | 9/2016 | ............... | F16J 15/18 |
| WO | WO 2017/065069 | 4/2017 | ............... | F16J 15/18 |

OTHER PUBLICATIONS

U.S. Appl. No. 17/047,631, filed Oct. 14, 2020, Kimura at al.
U.S. Appl. No. 17/047,645, filed Oct. 14, 2020, Kimura et al.
International Preliminary Report on Patentability issued in PCT/JP2019/019498, dated Nov. 17. 2020, with English translation, 6 pages.
International Search Report and Written Opinion issued in PCT/JP2019/019498, dated Jul. 2, 2019, with English translation, 12 pages.
International Preliminary Report on Patentability issued in PCT/JP2019/019499, dated Nov. 17. 2020, with English translation, 8 pages.
International Search Report and Written Opinion issued in PCT/JP2019/019499, dated Jul. 9, 2019, with English translation, 15 pages.
International Preliminary Report on Patentability issued in PCT/JP2019/019500, dated Nov. 17, 2020, with English translation, 12 pages.
International Search Report and Written Opinion issued in PCT/JP2019/019500, dated Jul. 2, 2019, with English translation, 20 pages.
International Preliminary Report on Patentability issued in PCT/JP2019/019501, dated Nov. 17, 2020, with English translation, 6 pages.
International Search Report and Written Opinion issued in PCT/JP2019/019501, dated Aug. 6, 2019, with English translation, 10 pages.
International Preliminary Report on Patentability issued in PCT/JP2019/019505, dated Nov. 17, 2020, with English translation, 6 pages.
International Search Report and Written Opinion issued in PCT/JP2019/019505, dated Jul. 2, 2019, with English translation, 12 pages.

* cited by examiner

Fig.6
(a)
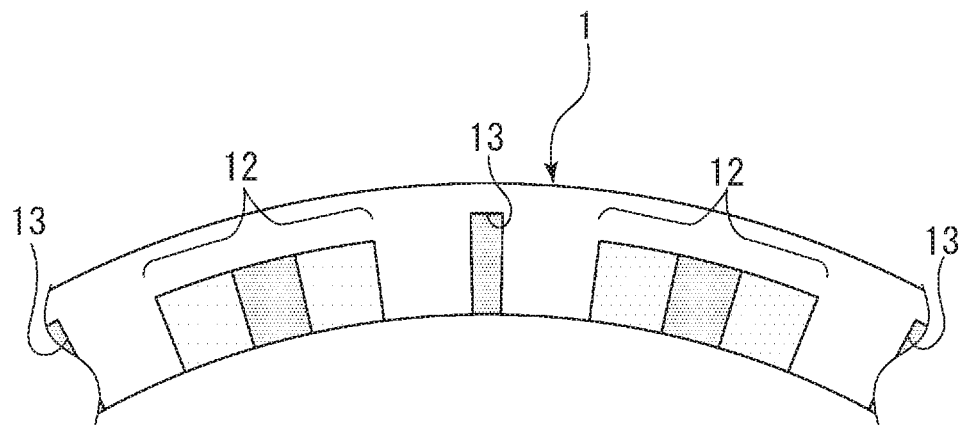
(b)
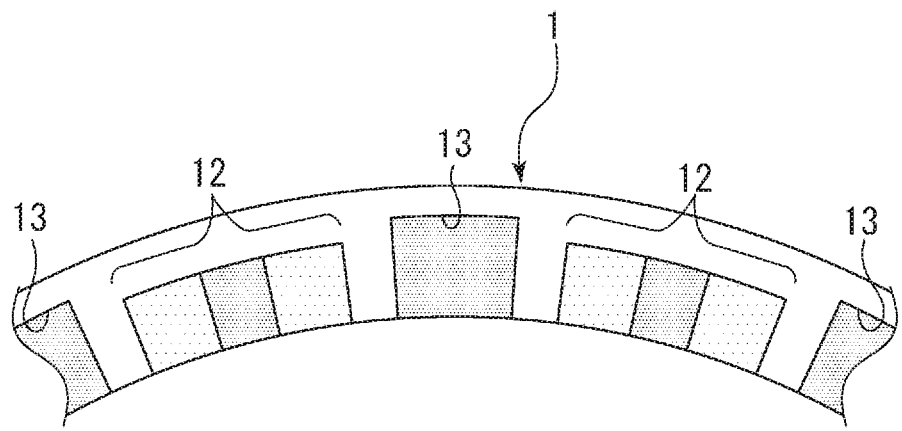

Fig.9
(a)
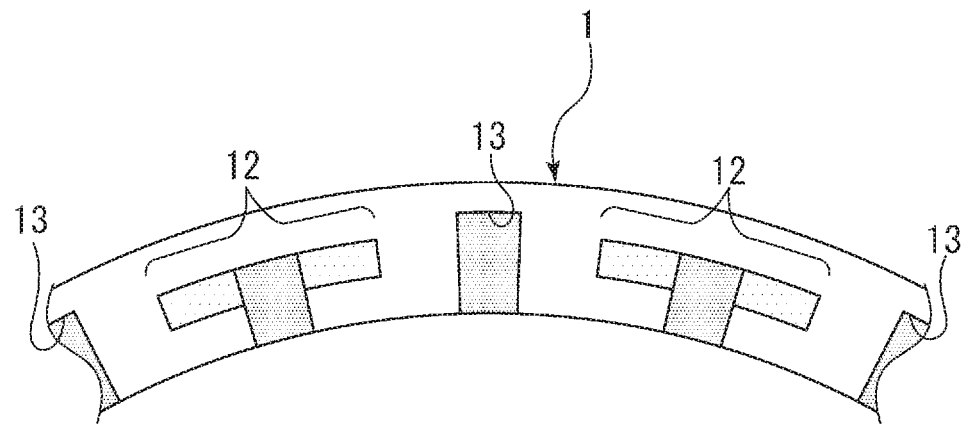
(b)
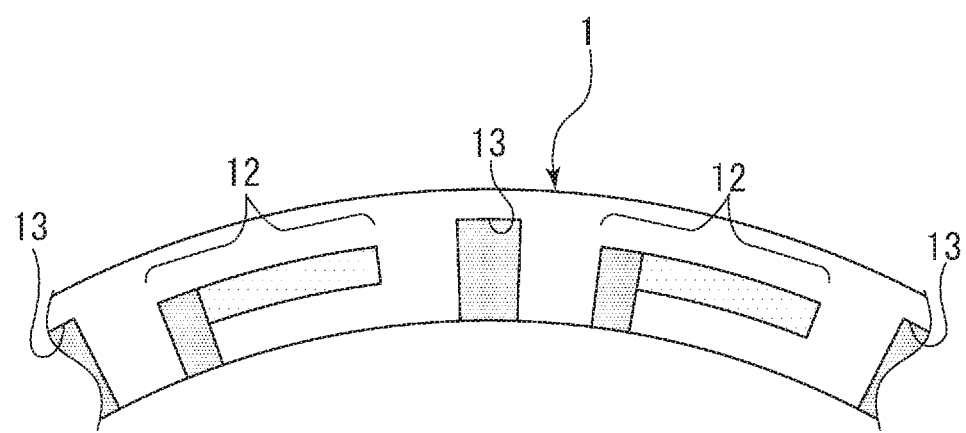
(c)
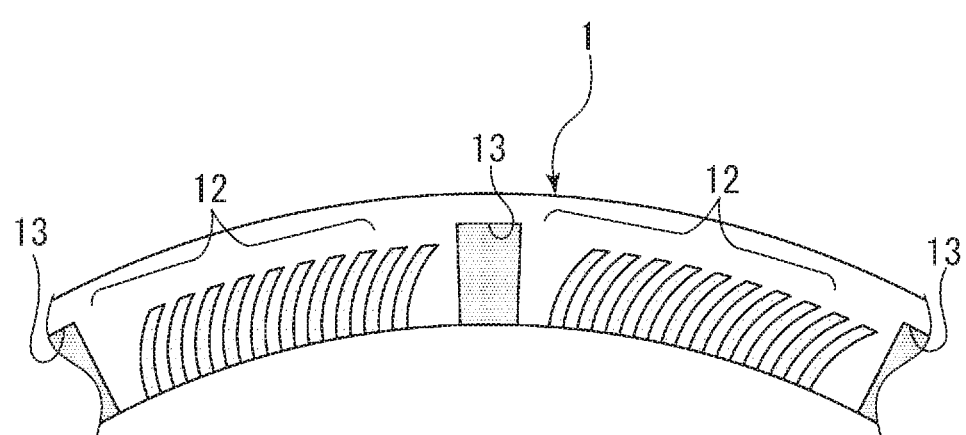

Fig.13
(a)
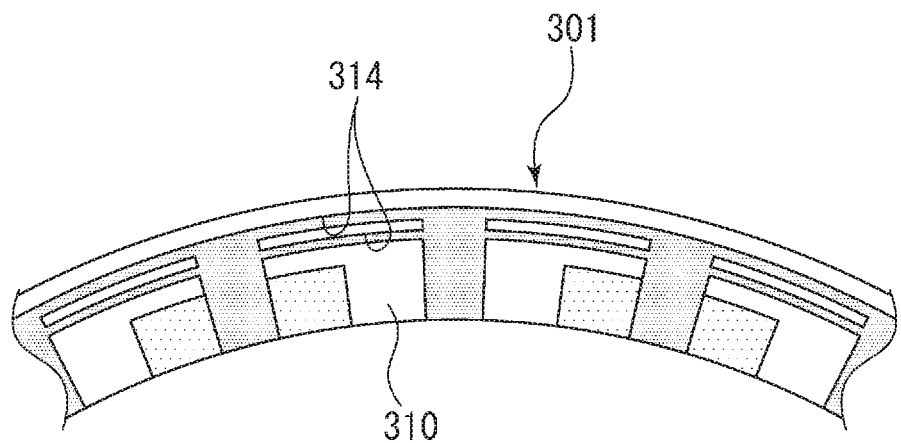
(b)
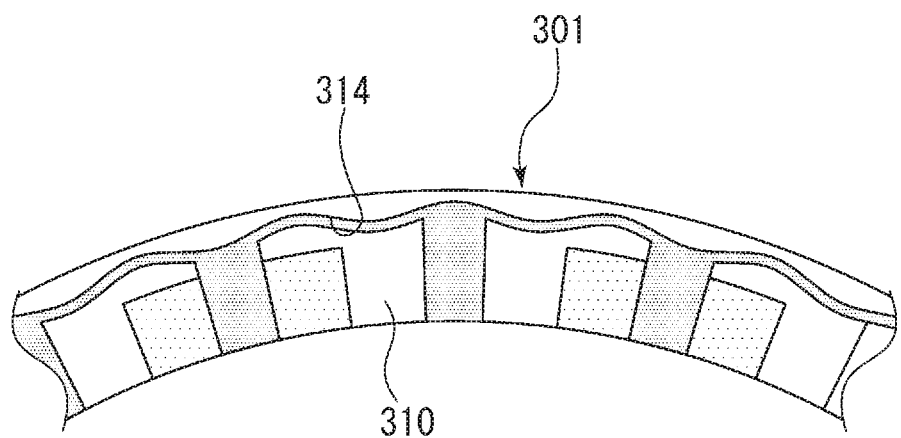

SEAL RING

TECHNICAL FIELD

The present invention relates to a seal ring used for sealing a clearance between a rotary shaft and a housing, and specifically relates to a seal ring used with the seal ring being attached to an annular groove, i.e., a so-called stuffing box.

BACKGROUND ART

Typically, a seal ring is attached to an annular groove at the outer periphery of a rotary shaft. A sliding surface of the seal ring slides in close contact with a sliding surface formed at the rotary shaft, and accordingly, the seal ring seals a clearance between the rotary shaft and a housing to prevent leakage of sealed fluid.

For maintaining sealing properties in the seal ring for a long period of time, conflicting conditions of "sealing" and "lubrication" need to be satisfied. Particularly in recent years, while prevention of leakage of the sealed fluid has been made for, e.g., environmental measures, a demand for friction reduction has increased for reducing a mechanical loss. Friction reduction can be accomplished by the technique of generating a dynamic pressure between the sliding surfaces by rotation of the rotary shaft to interpose a fluid film of the sealed fluid between the sliding surfaces.

For example, a seal ring as described in Patent Citation 1 has been known as the seal ring configured to generate the dynamic pressure between the sliding surfaces by rotation of the rotary shaft. The seal ring of Patent Citation 1 is attached to an annular groove provided at the outer periphery of a rotary shaft. The seal ring is pressed to a housing side and one side wall surface side of the annular groove by the pressure of high-pressure sealed fluid, and a sliding surface on one side surface side of the seal ring slides in close contact with a sliding surface on one side wall surface side of the annular groove. Moreover, at the sliding surface on one side surface side of the seal ring, multiple dynamic pressure grooves opening on an inner diameter side are provided in a circumferential direction. The dynamic pressure groove includes a deep groove at the center in the circumferential direction and shallow grooves formed continuously to both sides of the deep groove in the circumferential direction, extending in the circumferential direction, and having bottom surfaces inclined such that the shallow grooves gradually become shallower toward terminal ends in the circumferential direction. When the rotary shaft and the seal ring rotate relative to each other, the sealed fluid is introduced from the inner diameter side into the deep grooves. Moreover, a negative pressure is generated in each shallow groove of the seal ring on a side opposite to a rotation direction of the rotary shaft. Meanwhile, the sealed fluid introduced into the deep grooves is supplied to each shallow groove on the same side as the rotation direction, and therefore, a positive pressure is generated in such a shallow groove. Then, the positive pressure increases due to wedge action caused by the inclined bottom surface of the shallow groove, and is generated across the entirety of the dynamic pressure groove. Accordingly, the force of slightly separating the sliding surfaces from each other, i.e., so-called buoyancy, is obtained. The sliding surfaces are slightly separated from each other, and therefore, the high-pressure sealed fluid flows into a portion between the sliding surfaces from the inner diameter side and the sealed fluid flows out of the rotation-direction-side shallow grooves generating the positive pressure to the portion between the sliding surfaces. Thus, a fluid film is formed between the sliding surfaces, and lubricity between the sliding surfaces is maintained.

CITATION LIST

Patent Literature

Patent Citation 1: JP 9-210211 A (third page, FIG. 3)

SUMMARY OF INVENTION

Technical Problem

In the seal ring of Patent Citation 1, the sliding surface of the rotary shaft moves relative to the dynamic pressure grooves in the circumferential direction. Upon rotation of the rotary shaft, the sealed fluid is sufficiently supplied to the rotation-direction-side shallow grooves from the deep grooves to form the fluid film between the sliding surfaces. However, particularly upon use for the rotary shaft rotating at high speed, there is the following possibility. A great negative pressure is generated in the circumferential direction in addition to a great positive pressure. Accordingly, it is difficult to hold the sealed fluid on the shallow grooves generating the negative pressure and the periphery thereof. Moreover, the supply amount of the sealed fluid moving in the circumferential direction from these shallow grooves to the deep grooves decreases, and therefore, the sealed fluid is not sufficiently supplied from the deep grooves to the rotation-direction-side shallow grooves generating the positive pressure. Consequently, the positive pressure does not increase across the entirety of each dynamic pressure groove as expected in association with an increase in the number of rotations, and a sufficient fluid film is not formed.

The present invention has been made in view of such a problem, and an object of the present invention is to provide a seal ring configured so that a fluid film can be formed between sliding surfaces across a wide range of rotation speed and configured with high lubricity.

Solution to Problem

For solving the above-described problem, a seal ring for sealing a clearance between a rotary shaft and a housing according to the present invention includes: dynamic pressure grooves formed at a sliding surface of the seal ring and including positive pressure generators and negative pressure generators; and static pressure supply paths formed at the sliding surface of the seal ring to extend from an inner diameter side to an outer diameter side and to open on a sealed fluid side, wherein each of the positive pressure generators, each of the negative pressure generators, and each of the static pressure supply paths are arranged in description order in a circumferential direction of the sliding surface. According to the aforesaid feature, the sealing fluid is supplied from the static pressure supply path to which the high-pressure sealed fluid is introduced to the negative pressure generator adjacent to such a static pressure supply path in the circumferential direction. Thus, the sealed fluid is held on the negative pressure generator and the periphery thereof, and is sufficiently supplied from the negative pressure generator to the positive pressure generator. Consequently, a fluid film can be formed between the sliding surfaces of the seal ring and a mating ring across a wide range of rotation speed, and lubricity of the seal ring can be enhanced.

It may be preferable that each of the static pressure supply paths is provided adjacent two of the dynamic pressure grooves in the circumferential direction. According to this preferable configuration, even when the seal ring rotates in any direction, the sealed fluid can be supplied to the negative pressure generator of the dynamic pressure groove from the static pressure supply path adjacent to such a negative pressure generator in the circumferential direction.

It may be preferable that the dynamic pressure grooves and the static pressure supply paths are alternately provided across the circumferential direction of the sliding surface. According to this preferable configuration, the sealed fluid is supplied to all dynamic pressure grooves from the static pressure supply paths adjacent to these dynamic pressure grooves in the circumferential direction. Thus, buoyancy can be generated between the sliding surfaces with favorable balance across the circumferential direction.

It may be preferable that each of the static pressure supply paths is a groove extending from the inner diameter side toward the outer diameter side. According to this preferable configuration, the static pressure supply path is a groove continuously opening in a radial direction from the inner diameter side of the sliding surface, and therefore, the fluid can be supplied to a wide area of the sliding surface.

It may be preferable that each of the static pressure supply paths is formed deeper on the inner diameter side than on the outer diameter side. According to this preferable configuration, the flow of the sealed fluid is generated in the radial direction from the inner diameter side to the outer diameter side of the static pressure supply path, and the sealed fluid is easily supplied.

It may be preferable that outer diameter ends of the static pressure supply paths are formed on the outer diameter side with respect to outer diameter ends of the dynamic pressure grooves. According to this preferable configuration, the sealed fluid can be reliably supplied to the negative pressure generator of the dynamic pressure groove from the static pressure supply path adjacent to such a negative pressure generator in the circumferential direction.

It may be preferable that the static pressure supply paths communicate with each other through a communication groove extending in the circumferential direction on the outer diameter side. According to this preferable configuration, the sealed fluid introduced to the static pressure supply path from the inner diameter side is supplied to the outer diameter side of the sliding surface by the communication groove, and therefore, the lubricity can be further enhanced.

It may be preferable that the communication groove is in an arc shape. According to this preferable configuration, the sealed fluid follows the rotation direction of the rotary shaft in the communication groove, and therefore, is easily supplied across the circumferential direction of the communication groove.

It may be preferable that the communication groove is in a wave shape. According to this preferable configuration, the sealed fluid can flow out to a wide area of the sliding surface on the outer diameter side from the communication groove, and the area of the communication groove can be increased. Thus, the lubricity can be further enhanced.

It may be preferable that all of the static pressure supply paths communicate with each other through the communication groove. According to this preferable configuration, the sealed fluid is, with favorable balance, supplied to the outer diameter side of the sliding surface across the circumferential direction, and therefore, the lubricity can be further enhanced.

It may be preferable that each of the dynamic pressure grooves includes a deep groove opening on the sealed fluid side and a shallow groove shallower than the deep groove and extending continuously to the deep groove in the circumferential direction. According to this preferable configuration, the sealed fluid can be reliably supplied to the shallow groove through the deep groove even upon high-speed rotation of the seal ring.

It may be preferable that each of the dynamic pressure grooves opens on the sealed fluid side, and includes a deep groove at the center in the circumferential direction and two shallow grooves shallower than the deep groove and formed continuously to both sides of the deep groove in the circumferential direction, the shallow grooves extending in the circumferential direction and having bottom surfaces inclined such that the shallow grooves gradually become shallower toward terminal ends in the circumferential direction. According to this preferable configuration, the seal ring can be rotated in both directions upon use.

It may be preferable that the deep groove communicates with the communication groove. According to this preferable configuration, the sealed fluid is supplied to the deep groove from the communication groove. Thus, the sealed fluid is sufficiently supplied to the shallow groove as the positive pressure generator, and the buoyancy due to a positive pressure is more easily obtained across the entirety of the dynamic pressure groove.

BRIEF DESCRIPTION OF DRAWINGS

FIGS. 6A and 6B are partial side views of seal rings of variations B, C of the first embodiment.

FIGS. 9A to 9C are partial side views of seal rings of variations F to H of the first embodiment.

FIGS. 13A and 13B are partial side views of seal rings of variations I and J of the third embodiment.

DESCRIPTION OF EMBODIMENTS

Figure 1:
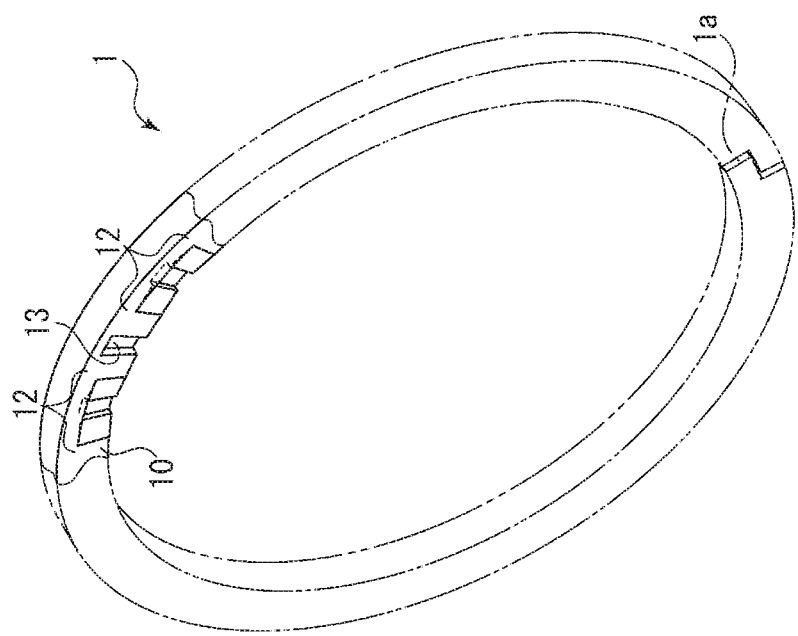
FIG. 1 is a perspective view illustrating a seal ring in a first embodiment of the present invention by partially-simplified illustration.

Hereinafter, modes for carrying out a seal ring according to the present invention will be described based on embodiments.

First Embodiment

A seal ring according to a first embodiment of the present invention will be described with reference to FIGS. 1 to 4.

Hereinafter, the right side in the plane of paper of FIG. 2 will be described as a sealed fluid side L, and the left side in the plane of paper will be described as an atmosphere side A. Note that the fluid pressure of sealed fluid on the sealed fluid side L will be described as a higher pressure than an atmospheric pressure. Moreover, a sliding surface includes a flat surface and a groove recessed as compared to the flat surface. For the sake of convenience in description, the flat surface forming the sliding surface is, in the drawings, indicated by the color of white, and the groove forming the sliding surface is indicated by dots.

The seal ring 1 according to the present embodiment seals a portion between a rotary shaft 2 and a housing 3 of a rotary machine, the rotary shaft 2 and the housing 3 rotating relative to each other. In this manner, the seal ring 1 partitions the inside of the housing 3 into the sealed fluid side L and the atmosphere side A (see FIG. 2), and prevents leakage of the sealed fluid from the sealed fluid side L to the atmosphere side A. Note that the rotary shaft 2 and the housing 3 are made of a metal material such as stainless steel. Moreover, the sealed fluid is one used for the purpose of cooling and lubricating, e.g., a not-shown gear and a not-shown bearing provided in a machine chamber of the rotary machine, such as oil.

Figure 2:
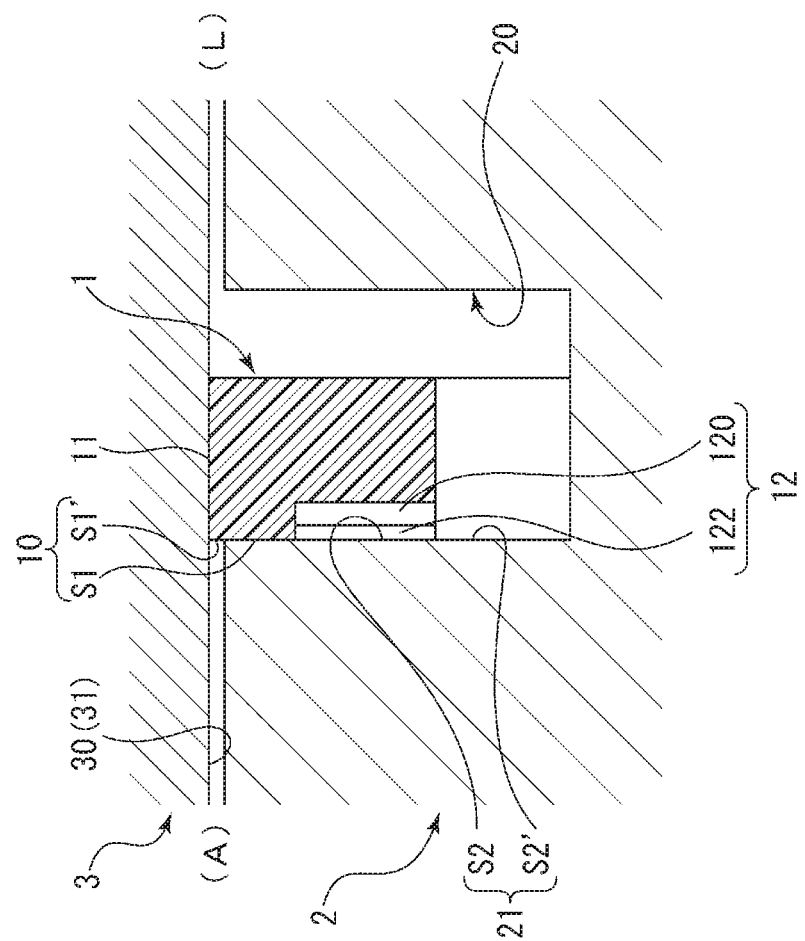
FIG. 2 is a sectional view illustrating a sealing structure for a clearance between a rotary shaft and a housing by the seal ring in the first embodiment.

As illustrated in FIGS. 1 and 2, the seal ring 1 is a component molded with resin such as PTFE, and is provided with a joint portion 1a at one spot in a circumferential direction to form a C-shape. The seal ring 1 is used with the seal ring 1 being attached to an annular groove 20, the annular groove 20 being provided along the outer periphery of the rotary shaft 2 and having a rectangular sectional shape. Moreover, the seal ring 1 has a rectangular sectional shape. The seal ring 1 is pressed to the atmosphere side A by the fluid pressure of the sealed fluid acting on a side surface on the sealed fluid side L, and accordingly, a sliding surface S1 formed on a side surface 10 (hereinafter sometimes merely referred to as a "side surface 10") side on the atmosphere side A slidably closely contacts a sliding surface S2 on a side wall surface 21 (hereinafter sometimes merely referred to as a "side wall surface 21") side of the annular groove 20 on the atmosphere side A. Further, in response to stress in an expansion direction due to the fluid pressure of the sealed fluid acting on an inner circumferential surface, the seal ring 1 is pressed in an outer diameter direction, and accordingly, an outer circumferential surface 11 closely contacts an inner circumferential surface 31 of a shaft hole 30 of the housing 3.

Note that the sliding surfaces S1, S2 form a substantial sliding region between the side surface 10 of the seal ring 1 and the side wall surface 21 of the annular groove 20 of the rotary shaft 2. Moreover, a non-sliding surface S1' is formed continuously to an outer diameter side of the sliding surface S1 on the side surface 10 side, and a non-sliding surface S2' is formed continuously to an inner diameter side of the sliding surface S2 on the side wall surface 21 side (see FIG. 2).

As illustrated in FIGS. 1 to 4, the sliding surface S1 formed on the side surface 10 side of the seal ring 1 includes a flat surface 16, multiple dynamic pressure grooves 12 provided in the circumferential direction, and static pressure grooves 13 (also referred to as static pressure supply paths) each provided between adjacent ones of the dynamic pressure grooves 12 in the circumferential direction. Note that the dynamic pressure grooves 12 and the static pressure grooves 13 are arranged at equal intervals in the circumferential direction of the sliding surface S1, except for the vicinity of the joint portion 1a. The dynamic pressure grooves 12 and the static pressure grooves 13 are alternately provided across the circumferential direction.

Figure 3:
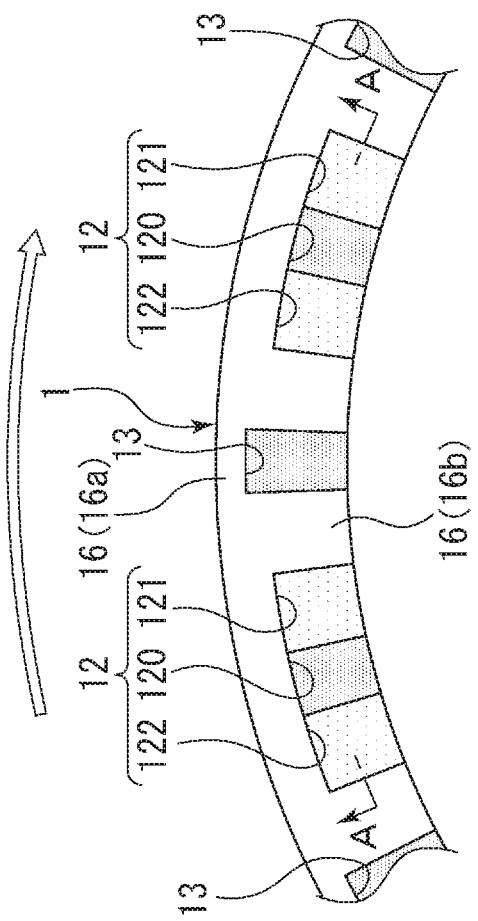
FIG. 3 is a partial side view of the seal ring in the first embodiment.

The flat surface 16 includes a seal portion 16a positioned on the outer diameter side and formed continuously in a substantially annular shape across the joint portion 1a, and a lubrication portion 16b positioned on the inner diameter side, sandwiched by adjacent ones of the dynamic pressure grooves 12 and the static pressure grooves 13 in the circumferential direction, and formed continuously to the seal portion 16a (see FIG. 3).

Figure 4:
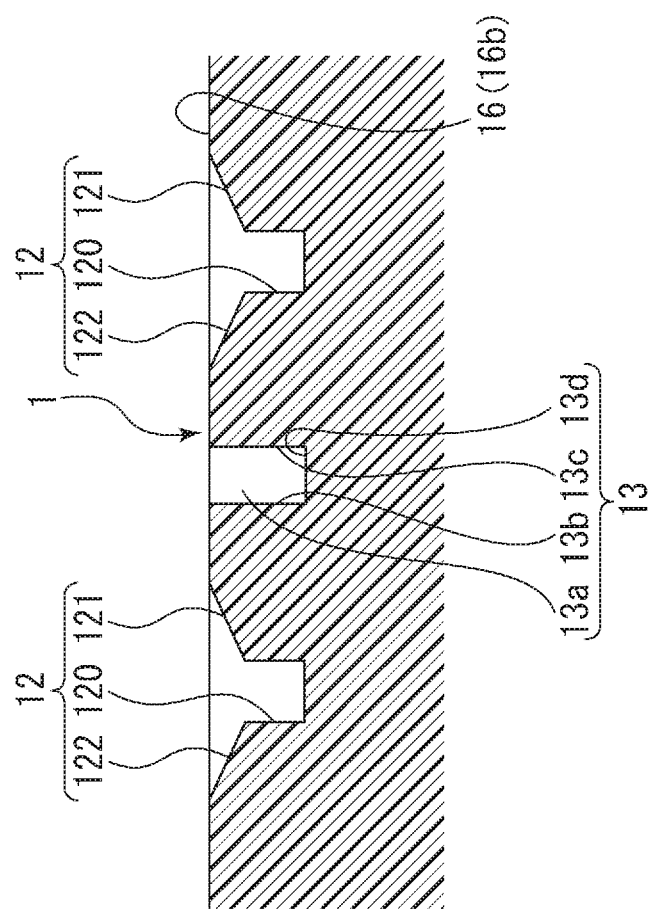
FIG. 4 is an A-A sectional view of the seal ring of FIG. 3.

As illustrated in FIGS. 3 and 4, the dynamic pressure groove 12 has the function of generating a dynamic pressure according to rotation of the rotary shaft 2, and opens on the inner diameter side (also referred to as a sealed fluid side) of the seal ring 1. The dynamic pressure groove 12 includes a deep groove 120 provided at the center in the circumferential direction and a pair of shallow grooves 121, 122 (also referred to as a positive pressure generator and a negative pressure generator) formed continuously from both sides of the deep groove 120 in the circumferential direction and extending in the circumferential direction. Note that in FIGS. 3 and 4, the right side with respect to the deep groove 120 in the plane of paper will be described as the shallow groove 121 (i.e., the positive pressure generator), and the left side in the plane of paper will be described as the shallow groove 122 (i.e., the negative pressure generator).

Specifically, as illustrated in FIG. 4, the deep groove 120 has a bottom surface formed flat, and the shallow grooves 121, 122 have bottom surfaces as inclined surfaces formed such that the shallow grooves 121, 122 gradually become shallower from a deep groove 120 side to terminal ends in the circumferential direction. Moreover, the bottom surface of the deep groove 120 is formed deeper than deepest portions of the shallow grooves 121, 122, and the depth of the deep groove 120 is several tens to several hundreds of μm and preferably 100 to 200 μm.

As illustrated in FIGS. 3 and 4, the static pressure groove 13 supplies, regardless of rotation/stop of the rotary shaft 2, the sealed fluid to a portion between the sliding surfaces S1, S2 when the sealed fluid has a higher pressure than that of atmospheric air. The static pressure groove 13 has a substantially rectangular shape as viewed from the side. The static pressure groove 13 opens on the inner diameter side (i.e., the sealed fluid side) of the seal ring 1, and is closed on the outer diameter side. The static pressure groove 13 is formed longer in a radial direction than the dynamic pressure groove 12 (i.e., the deep groove 120 and the shallow grooves 121, 122). Further, a bottom surface 13d of the static pressure groove 13 is formed flat, and is parallel with the flat surface 16. The depth of the static pressure groove 13 is substantially the same as that of the deep groove 120. Note that the depth of the static pressure groove 13 may be deeper than that of the deep groove 120 (up to about a depth of 1 mm). Moreover, any of three side surfaces 13a, 13b, 13c of the static pressure groove 13 extends perpendicularly from the bottom surface 13d (specifically see FIG. 4).

Next, fluid film formation between the sliding surfaces S1, S2 upon rotation of the rotary shaft 2 will be described. Note that a case where the rotary shaft 2 rotates clockwise as indicated by a white arrow in FIG. 3, i.e., a case where the seal ring 1 rotates counterclockwise relative to the annular groove 20 of the rotary shaft 2 in FIG. 3, will be described herein by way of example. Upon relative rotation of the rotary shaft 2 and the housing 3, the sliding surface S1 on the side surface 10 side slides on the sliding surface S2 on the side wall surface 21 side. At this point, the sealed fluid is introduced from the inner diameter side to the deep grooves 120 of the dynamic pressure grooves 12 and the static pressure grooves 13 provided at the sliding surface S1. Moreover, a negative pressure is generated in each shallow groove 122 (hereinafter merely referred to as a "shallow groove 122") of the seal ring 1 on a side (the left side in the plane of paper of FIG. 3) opposite to a rotation direction of the rotary shaft 2. Meanwhile, the sealed fluid introduced into the deep grooves 120 is supplied to each shallow groove 121 (hereinafter merely referred to as a "shallow groove 121") of the seal ring 1 on the same side (i.e., the right side in the plane of paper of FIG. 3) as the rotation direction, and a positive pressure is generated in such a shallow groove 121 due to wedge action caused by the inclined surface. Then, the positive pressure is generated across the entirety of the dynamic pressure groove 12, and accordingly, the force of slightly separating the sliding surfaces S1, S2 from each other, i.e., so-called buoyancy, is obtained. The sliding surfaces S1, S2 are slightly separated from each other, and therefore, the high-pressure sealed fluid flows into the portion between the sliding surfaces S1, S2 from the inner diameter side and the sealed fluid flows out of the shallow groove 121 generating the positive pressure to the portion between the sliding surfaces S1, S2. Further, the force of sucking the sealed fluid present between the sliding surfaces S1, S2 around the dynamic pressure groove 12 acts on the shallow groove 122 generating the negative pressure in the dynamic pressure groove 12. Thus, the sealed fluid is supplied to the shallow groove 122 and the surrounding lubrication portion 16b thereof from the static pressure groove 13 adjacent to such a shallow groove 122 in the circumferential direction.

According to such a configuration, the sealed fluid is supplied from the static pressure groove 13 to which the high-pressure sealed fluid is introduced to the shallow groove 122 as the negative pressure generator adjacent to such a static pressure groove 13 in the circumferential direction. Thus, the sealed fluid is held on the shallow groove 122 and the surrounding lubrication portion 16b thereof, and is sufficiently supplied from the deep groove 120 and the shallow groove 122 to the shallow groove 121 as the positive pressure generator. Consequently, a fluid film can be formed between the sliding surfaces S1, S2 across a wide range of rotation speed, and lubricity of the seal ring 1 can be enhanced.

Moreover, the shallow groove 122 as the negative pressure generator in the dynamic pressure groove 12 opens on the inner diameter side (i.e., the sealed fluid side), and the sealed fluid is also introduced from the inner diameter side of the sliding surface S1. Thus, the sealed fluid is easily held on the shallow groove 122.

Further, in the shallow groove 122 as the negative pressure generator in the dynamic pressure groove 12, the sealed fluid is held, and the negative pressure is reduced. Thus, the dynamic pressure can be generated in a state in which variation in a pressure (i.e., the positive pressure and the negative pressure) in the circumferential direction is reduced corresponding to the formation positions of the dynamic pressure grooves 12 in the radial direction between the sliding surfaces S1, S2. Consequently, vibration due to, e.g., cavitation can be prevented while the lubricity of the seal ring 1 can be enhanced.

In addition, the static pressure groove 13 is formed longer in the radial direction than the dynamic pressure groove 12 (i.e., the shallow groove 122), and therefore, the sealed fluid can be reliably supplied to the shallow groove 122 as the negative pressure generator from the static pressure groove 13 adjacent to such a shallow groove 122 in the circumferential direction. Further, the static pressure groove 13 extends to a position on the outer diameter side with respect to the dynamic pressure groove 12, and therefore, the sealed fluid can be supplied to the outer diameter side (i.e., the outer diameter side with respect to the dynamic pressure groove 12) of the sliding surface S1 to form the fluid film between the sliding surfaces S1, S2. Consequently, the lubricity of the seal ring 1 can be further enhanced.

Moreover, the static pressure groove 13 is provided at a position sandwiched by the dynamic pressure grooves 12 in the circumferential direction. Thus, even when the seal ring 1 rotates in any direction, the sealed fluid can be reliably supplied to the shallow groove 122 as the negative pressure generator from the static pressure groove 13 adjacent to such a shallow groove 122 in the circumferential direction. Further, the dynamic pressure grooves 12 and the static pressure grooves 13 are alternately provided across the circumferential direction of the sliding surface S1, and therefore, the sealed fluid is supplied to all dynamic pressure grooves 12 from the static pressure grooves 13 adjacent to these dynamic pressure grooves 12 in the circumferential direction. Thus, the buoyancy can be generated with favorable balance across the circumferential direction of the sliding surface S1. Moreover, the static pressure grooves 13 are formed in addition to the dynamic pressure grooves 12, and therefore, a contact area (e.g., the area of the flat surface 16) between the sliding surfaces S1, S2 can be decreased. In addition, the sealed fluid is stored in the static pressure grooves 13 and lubrication between the sliding surfaces S1, S2 is promoted, and therefore, abrasion of the sliding surface S1 can be reduced.

Moreover, the static pressure groove 13 is a groove continuously opening in the radial direction from the inner diameter side to the outer diameter side of the sliding surface S1, and therefore, the sealed fluid flows out of the static pressure grooves 13 to follow the rotation direction of the rotary shaft 2. Thus, the sealed fluid can be supplied to a wide area between the sliding surfaces S1, S2. Moreover, an outer diameter end of the static pressure groove 13 is formed on the outer diameter side with respect to an outer diameter end of the dynamic pressure groove 12. Thus, the sealed fluid can be reliably supplied to the shallow groove 122 as the negative pressure generator in the dynamic pressure groove 12 from the static pressure groove 13 adjacent to such a shallow groove 122 in the circumferential direction, and can be supplied to the seal portion 16a positioned on the outer diameter side (i.e., the outer diameter side with respect to the dynamic pressure groove 12) between the sliding surfaces S1, S2 to form the fluid film on the seal portion 16a. Consequently, the lubricity of the seal ring 1 can be further enhanced.

Further, the dynamic pressure groove 12 includes the deep groove 120 opening on the inner diameter side at the center in the circumferential direction and the shallow grooves 121, 122 formed continuously to both sides of the deep groove 120 in the circumferential direction, extending in the circumferential direction, and having the bottom surfaces inclined such that the shallow grooves 121, 122 gradually become shallower toward the terminal ends in the circumferential direction. Thus, the seal ring 1 can be rotated in both directions upon use, and even upon high-speed rotation, the sealed fluid can be reliably supplied to any of the shallow grooves 121, 122 through the deep grooves 120.

In addition, the seal ring 1 is in the C-shape, and therefore, seal performance can be stably maintained even when the circumferential length of the seal ring 1 changes due to thermal expansion/contraction.

Figure 5:
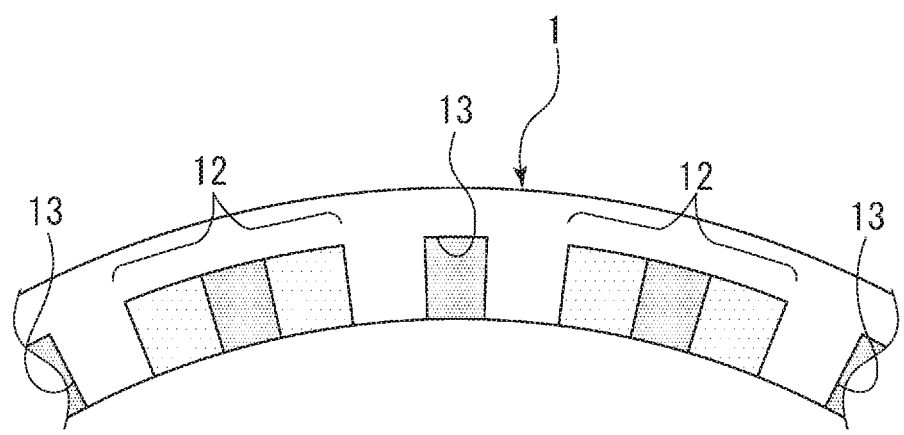
FIG. 5 is a partial side view of a seal ring of a variation A of the first embodiment.

Next, variations of the seal ring 1 in the first embodiment will be described. As in a variation A of the seal ring 1 in the first embodiment as illustrated in FIG. 5, the static pressure groove 13 may be formed with the substantially same length in the radial direction as that of the dynamic pressure groove 12.

Moreover, as in variations B, C of the seal ring 1 in the first embodiment as illustrated in FIGS. 6A and 6B, the width of the static pressure groove 13 in the circumferential direction may be such a narrow width that a length in the circumferential direction is less than ⅓ of a length in the radial direction or such a wide width that the length in the circumferential direction is equal to or greater than one time as long as the length in the radial direction.

Figure 7:
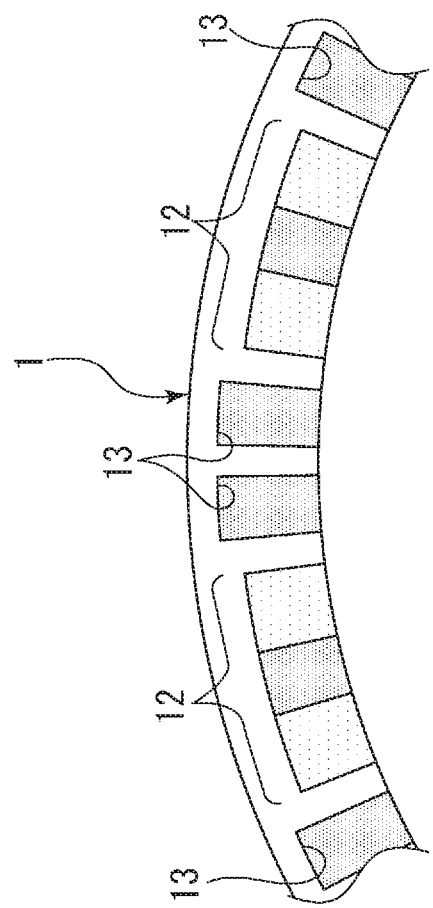
FIG. 7 is a partial side view of a seal ring of a variation D of the first embodiment.

Further, as in a variation D of the seal ring 1 in the first embodiment as illustrated in FIG. 7, the multiple static pressure grooves 13 may be formed in the circumferential direction between adjacent ones of the dynamic pressure grooves 12 in the circumferential direction.

Figure 8:
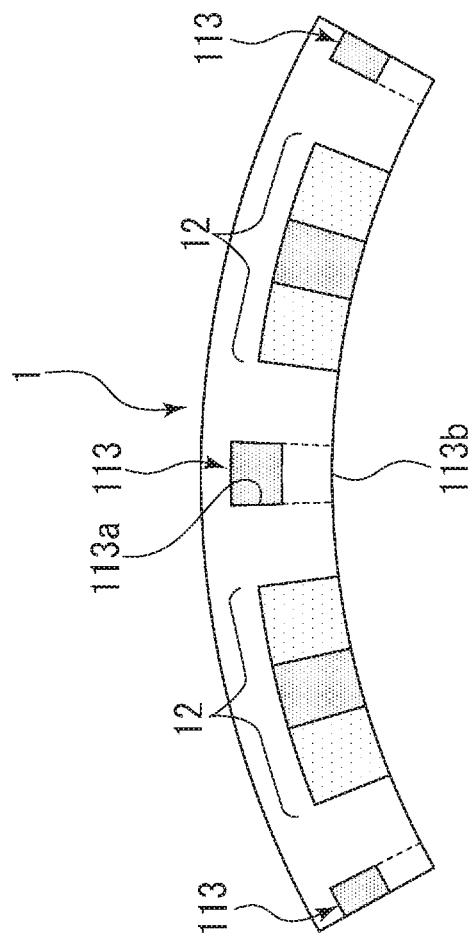
FIG. 8 is a partial side view of a seal ring of a variation E of the first embodiment.

In addition, as in a variation E of the seal ring 1 in the first embodiment as illustrated in FIG. 8, a static pressure supply path 113 is not a groove, but may be formed as a communication hole extending in a substantially L-shape in the seal ring 1. Specifically, the static pressure supply path 113 has an opening 113a opening in an axial direction between adjacent ones of the dynamic pressure grooves 12 in the circumferential direction on the outer diameter side of the sliding surface S1 and an opening 113b opening in an inner diameter direction at the substantially center of the inner circumferential surface of the seal ring 1 in the axial direction (or a thickness direction).

Moreover, as in variations F to H of the seal ring 1 in the first embodiment as illustrated in FIGS. 9A to 9C, the dynamic pressure groove 12 may be freely formed, and may be formed as, e.g., a T-shaped groove, a Rayleigh step, or a spiral groove.

Second Embodiment

Figure 10:
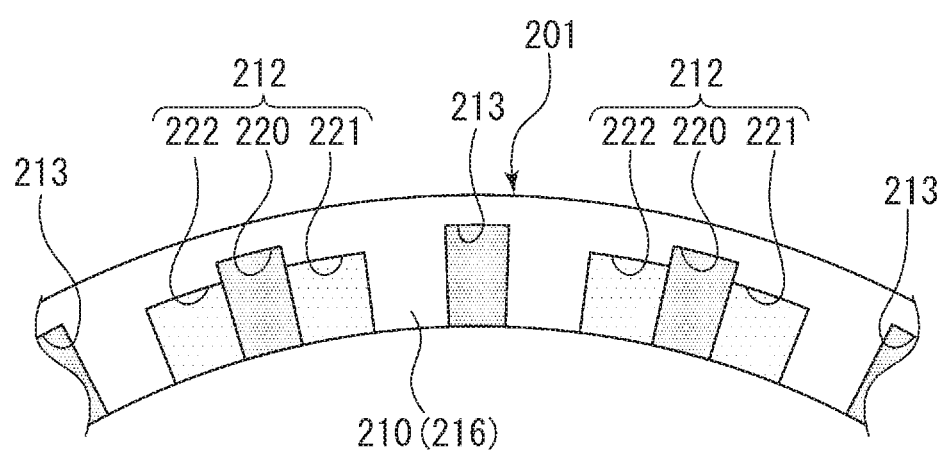
FIG. 10 is a partial side view of a seal ring of a second embodiment of the present invention.

Next, a seal ring according to a second embodiment will be described with reference to FIG. 10. Note that the same reference numerals are used to represent the same components as those described in the above-described embodiment, and overlapping description thereof will be omitted.

The seal ring 201 in the second embodiment will be described. As illustrated in FIG. 10, in the present embodiment, a sliding surface S1 (see FIG. 2) formed at a side surface 210 of the seal ring 201 includes a flat surface 216, multiple dynamic pressure grooves 212 provided in a circumferential direction, and static pressure grooves 213 (static pressure supply paths) each provided between adjacent ones of the dynamic pressure grooves 212 in the circumferential direction.

The dynamic pressure groove 212 opens on an inner diameter side (i.e., the sealed fluid side) of the seal ring 201, and includes a deep groove 220 provided at the center in the circumferential direction and a pair of shallow grooves 221, 222 (i.e., a positive pressure generator and a negative pressure generator) formed continuously from both sides of the deep groove 220 in the circumferential direction and extending in the circumferential direction. Moreover, the deep groove 220 is formed longer in a radial direction than the shallow grooves 221, 222, and has the substantially same length in the radial direction as that of the static pressure groove 213.

According to such a configuration, the deep groove 220 of the dynamic pressure groove 212 is formed with the substantially same length in the radial direction as that of the static pressure groove 213, and therefore, sealed fluid flows out of an outer diameter side of the static pressure grooves 213 and the deep grooves 220 of the dynamic pressure grooves 212 to follow a rotation direction of a rotary shaft 2. Thus, the sealed fluid can be sufficiently supplied to the outer diameter side between the sliding surfaces S1, S2 across a wide area. Further, the sealed fluid having flowed out of the outer diameter side of the static pressure grooves 213, to which the high-pressure sealed fluid is introduced, to follow the rotation direction of the rotary shaft 2 is specifically supplied to the outer diameter side of the deep grooves 220, and the sealed fluid is sufficiently supplied from the deep grooves 220 and the shallow grooves 222 to the shallow grooves 221 as the positive pressure generators. Thus, a fluid film can be formed between the sliding surfaces S1, S2 across a wide range of rotation speed, and lubricity of the seal ring 201 can be enhanced.

Third Embodiment

Figure 11:
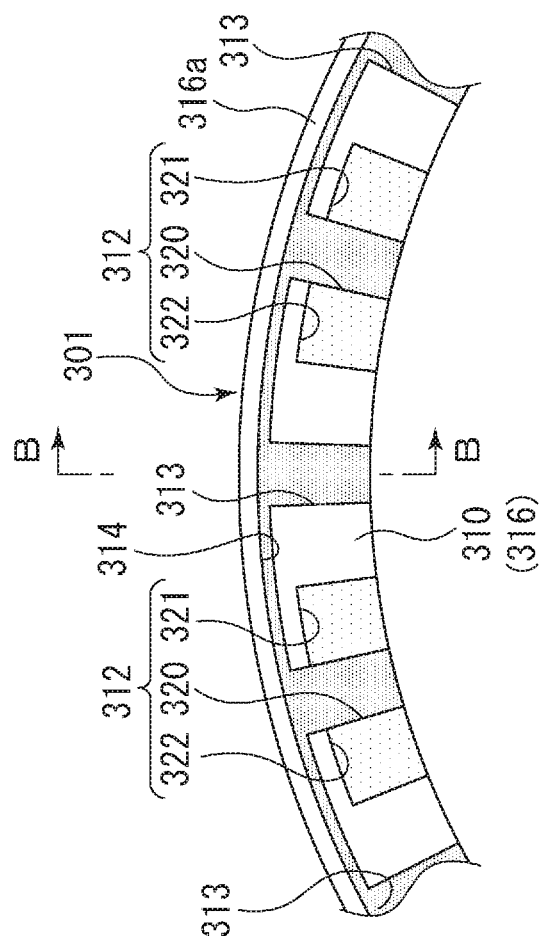
FIG. 11 is a partial side view of a seal ring of a third embodiment of the present invention.

Next, a seal ring according to a third embodiment will be described with reference to FIGS. 11, 12A, and 12B. Note that the same reference numerals are used to represent the same components as those described in the above-described embodiments, and overlapping description thereof will be omitted.

The seal ring 301 in the third embodiment will be described. As illustrated in FIG. 11, in the present embodiment, a sliding surface S1 (see FIG. 2) formed at a side surface 310 of the seal ring 301 includes a flat surface 316, multiple dynamic pressure grooves 312 provided in a circumferential direction, and static pressure grooves 313 (i.e., static pressure supply paths) each provided between adjacent ones of the dynamic pressure grooves 312 in the circumferential direction.

The dynamic pressure groove 312 opens on an inner diameter side (i.e., the sealed fluid side) of the seal ring 301, and includes a deep groove 320 provided at the center in the circumferential direction and a pair of shallow grooves 321, 322 (i.e., positive pressure generator and negative pressure generators) formed continuously from both sides of the deep groove 320 in the circumferential direction and extending in the circumferential direction. Moreover, the deep groove 320 is formed longer in a radial direction than the shallow grooves 321, 322, and has the substantially same length in the radial direction as that of the static pressure groove 313. Further, all of the deep grooves 320 of the multiple dynamic pressure grooves 312 and the multiple static pressure grooves 313 provided in the circumferential direction are communicated with each other through an arc-shaped communication groove 314 extending in the circumferential direction on an outer diameter side. Note that the communication groove 314 is formed on the outer diameter side of the flat surface 316 and the inner diameter side of a seal portion 316a continuously formed in a substantially annular shape across a joint portion 1a (see FIG. 1).

Figure 12:
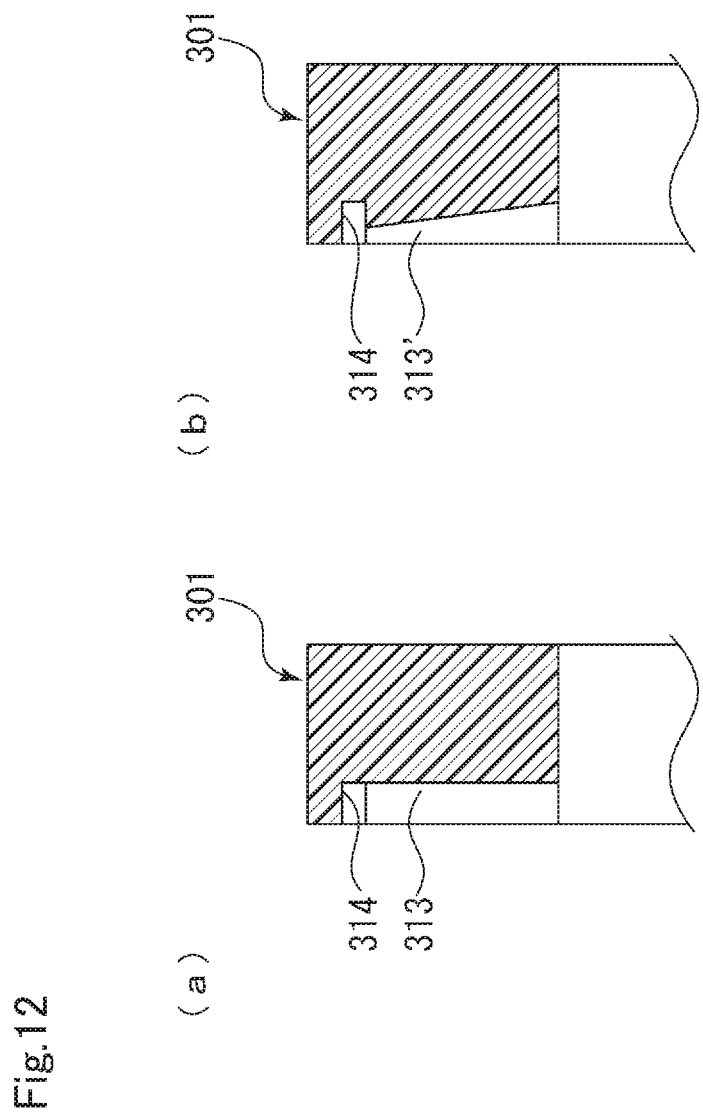
FIG. 12A is a B-B sectional view of the seal ring of FIG. 11.
FIG. 12B is a sectional view illustrating a variation of a static pressure groove of the third embodiment.

Moreover, as illustrated in FIG. 12A, the static pressure groove 313 and the communication groove 314 are formed with the substantially same depth. Note that for the sake of convenience in description, the deep groove 320 of the dynamic pressure groove 312 is, although not shown in the figure, also formed with the substantially same depth as that of the communication groove 314.

Further, the communication groove 314 is provided so that sealed fluid can flow out to a wide area on the outer diameter side between the sliding surfaces S1, S2 and lubricity of the seal ring 301 can be enhanced. In addition, all of the deep grooves 320 are communicated with the communication groove 314, and therefore, the sealed fluid supplied across the circumferential direction of the communication groove 314 is supplied to the deep grooves 320. Thus, the sealed fluid is sufficiently supplied to the shallow grooves 321 as the positive pressure generators, and buoyancy due to a positive pressure is more easily obtained across the entirety of each dynamic pressure groove 312.

Note that as illustrated in FIG. 12B, the static pressure groove 313 may be formed deeper on the inner diameter side than on the outer diameter side, and the communication groove 314 may be formed with the substantially same depth as that on the inner diameter side of the static pressure groove 313. According to such a configuration, the sealed fluid easily flows from the inner diameter side to the outer diameter side of the static pressure groove 313, and therefore, is easily introduced into the communication groove 314. Consequently, the lubricity of the seal ring 301 can be further enhanced.

Moreover, the static pressure groove 13 in the seal ring 1 of the first embodiment may be formed with the same depth from the inner diameter side to the outer diameter side, or may be formed with a smaller depth on the inner diameter side than on the outer diameter side.

Further, as in a variation I of the seal ring 301 in the third embodiment as illustrated in FIG. 13A, the communication groove 314 may be formed to extend in the circumferential direction from multiple spots in the radial direction (e.g., a double threaded shape).

In addition, as in a variation J of the seal ring 301 in the third embodiment as illustrated in FIG. 13B, the communication groove 314 may be formed in a wave shape. According to such a configuration, the sealed fluid can flow out to a wide area of the sliding surface S1 on the outer diameter side from the communication groove 314, and the area of the communication groove 314 can be increased. Thus, the lubricity of the seal ring 301 can be further enhanced.

The embodiments of the present invention have been described above with reference to the drawings, but specific configurations are not limited to these embodiments. The present invention also includes even changes and additions made without departing from the gist of the present invention.

For example, the configurations of the static pressure grooves described in the variations A to E of the first embodiment may be applied to the second embodiment, or the configurations of the static pressure grooves described in the variations B to E of the first embodiment may be applied to the third embodiment.

Moreover, the number and shape of dynamic pressure grooves provided at the sliding surface S1 of the seal ring and the number and shape of static pressure grooves provided at the sliding surface S1 of the seal ring may be changed as necessary such that a desired dynamic pressure effect is obtained. Note that the location and shape of the deep groove of the dynamic pressure groove to which the sealed fluid is introduced and the location and shape of the static pressure groove to which the sealed fluid is introduced may be changed as necessary according to the assumed degree of abrasion of the sliding surface.

Further, the shapes of the bottom and side surfaces of the static pressure groove are not limited to the rectangular shape, and may be freely formed. The side surface may extend with a slope from the bottom surface.

In addition, the seal ring may be formed in an annular shape without the joint portion 1a, and the outer shape thereof is not limited to a circular shape as viewed from the side. The seal ring may be formed in a polygonal shape.

Moreover, the seal ring is not limited to the rectangular sectional shape, and for example, may have a trapezoidal sectional shape or a polygonal sectional shape. The seal ring may be configured such that the side surface forming the sliding surface S1 is inclined.

Further, the grooves described in the above-described embodiments may be formed at the sliding surface S2 of the annular groove 20 of the rotary shaft 2.

In addition, the oil has been described as the example of the sealed fluid, but the sealed fluid may be liquid such as water or coolant or gas such as air or nitrogen.

REFERENCE SIGNS LIST 1 to 301 Seal ring
2 Rotary shaft
3 Housing
10 Side surface
12 Dynamic pressure groove
13 Static pressure groove (static pressure supply path)
16 Flat surface
16a Seal portion
16b Lubrication portion
20 Annular groove
21 Side wall surface
113 Static pressure supply path
120 Deep groove
121 Shallow groove (positive pressure generator)
122 Shallow groove (negative pressure generator)
210 Side surface
212 Dynamic pressure groove
213 Static pressure groove (static pressure supply path)
216 Flat surface
220 Deep groove
221 Shallow groove (positive pressure generator)
222 Shallow groove (negative pressure generator)
310 Side surface
312 Dynamic pressure groove
313 Static pressure groove (static pressure supply path)
314 Communication groove
316 Flat surface
316a Seal portion
320 Deep groove
321 Shallow groove (positive pressure generator)
322 Shallow groove (negative pressure generator)
S1, S2 Sliding surface
S1', S2' Non-sliding surface

The invention claimed is:

1. A seal ring for sealing a clearance between a rotary shaft and a housing, comprising:
   dynamic pressure grooves formed at a sliding surface of the seal ring and including positive pressure generators and negative pressure generators; and
   static pressure supply paths formed at the sliding surface of the seal ring to extend from an inner diameter toward an outer diameter side and to open on a sealed fluid side,
   wherein each of the positive pressure generators, each of the negative pressure generators, and each of the static pressure supply paths are arranged in description order in a circumferential direction of the sliding surface.

2. The seal ring according to claim 1, wherein each of the static pressure supply paths is provided between adjacent two of the dynamic pressure grooves in the circumferential direction.

3. The seal ring according to claim 2, wherein
the dynamic pressure grooves and the static pressure supply paths are alternately provided across the circumferential direction of the sliding surface.

4. The seal ring according to claim 3, wherein
each of the static pressure supply paths is formed deeper on the inner diameter side than on the outer diameter side.

5. The seal ring according to claim 2, wherein
each of the static pressure supply paths is a groove extending from the inner diameter side toward the outer diameter side.

6. The seal ring according to claim 5, wherein
each of the static pressure supply paths is formed deeper on the inner diameter side than on the outer diameter side.

7. The seal ring according to claim 1, wherein
the dynamic pressure grooves and the static pressure supply paths are alternately provided across the circumferential direction of the sliding surface.

8. The seal ring according to claim 1, wherein
each of the static pressure supply paths is a groove extending from the inner diameter side toward the outer diameter side.

9. The seal ring according to claim 8, wherein
each of the static pressure supply paths is formed deeper on the inner diameter side than on the outer diameter side.

10. The seal ring according to claim 1, wherein
outer diameter ends of the static pressure supply paths are formed on the outer diameter side with respect to outer diameter ends of dynamic pressure grooves.

11. The seal ring according to claim 1, wherein
the static pressure supply paths communicate with each other through a communication groove extending in the circumferential direction on the outer diameter side.

12. The seal ring according to claim 11, wherein
the communication groove is in an arc shape.

13. The seal ring according to claim 12, wherein
all of the static pressure supply paths communicate with each other through the communication groove.

14. The seal ring according to claim 11, wherein
the communication groove is in a wave shape.

15. The seal ring according to claim 14, wherein
all of the static pressure supply paths communicate with each other through the communication groove.

16. The seal ring according to claim 11, wherein
all of the static pressure supply paths communicate with each other through the communication groove.

17. The seal ring according to claim 1, wherein
each of the dynamic pressure grooves includes a deep groove opening on the sealed fluid side and a shallow groove shallower than the deep groove and extending continuously to the deep groove in the circumferential direction.

18. The seal ring according to claim 17, wherein the deep groove communicates with a communication groove.

19. The seal ring according to claim 1, wherein
each of the dynamic pressure grooves opens on the sealed fluid side, and includes a deep groove at a center in the circumferential direction and two shallow grooves shallower than the deep groove and formed continuously to both sides of the deep groove in the circumferential direction, the shallow grooves extending in the circumferential direction and having bottom surfaces inclined such that the shallow grooves gradually become shallower toward terminal ends thereof in the circumferential direction.

20. The seal ring according to claim 19, wherein the deep groove communicates with a communication groove.

* * * * *